US010248016B2

United States Patent
Maruta

(10) Patent No.: US 10,248,016 B2
(45) Date of Patent: Apr. 2, 2019

(54) REFLECTION TYPE SCREEN

(71) Applicant: ARISAWA MFG. CO., LTD., Niigata (JP)

(72) Inventor: Hajime Maruta, Niigata (JP)

(73) Assignee: ARISAWA MFG. CO., LTD., Niigata (JP)

(*) Notice: Subject to any disclaimer, the term of this patent is extended or adjusted under 35 U.S.C. 154(b) by 0 days.

(21) Appl. No.: 15/945,700

(22) Filed: Apr. 4, 2018

(65) Prior Publication Data

US 2018/0299761 A1    Oct. 18, 2018

(30) Foreign Application Priority Data

Apr. 12, 2017    (CN) .................. 2017 2 0380955 U

(51) Int. Cl.
*G03B 21/60*    (2014.01)
*G02B 17/00*    (2006.01)

(52) U.S. Cl.
CPC .......... *G03B 21/60* (2013.01); *G02B 17/002* (2013.01)

(58) Field of Classification Search
CPC ..................................... G03B 21/60
USPC ......................................... 359/459
See application file for complete search history.

(56) References Cited

U.S. PATENT DOCUMENTS

| | | | | |
|---|---|---|---|---|
| 8,115,996 B2 * | 2/2012 | Kitabayashi | ........... | G03B 21/60 359/443 |
| 2005/0248843 A1 * | 11/2005 | Maruta | ................ | G03B 21/602 359/459 |
| 2007/0217005 A1 * | 9/2007 | Novet | .................... | G03B 21/60 359/459 |

FOREIGN PATENT DOCUMENTS

JP    2003156799 A    5/2003

* cited by examiner

*Primary Examiner* — Christopher E Mahoney

(57) ABSTRACT

A reflection type screen including: a base portion which is tabular; and prism portions which are provided on one surface of the base portion, extending in one direction and lined up in a direction intersecting the one direction, wherein the prism portions each have: a pair of surfaces, at least one of the pair of surfaces being inclined with respect to the normal direction of the one surface of the base portion and intersecting the other of the pair of surfaces; and a reflecting layer, being formed on the one of the pair of surfaces and reflecting light, and the reflecting layer includes, on the one of the pair of surfaces, a first thin portion, a thick portion and a second thin portion in this order from a side of an intersection line of the one of the pair of surfaces and the other of the pair of surfaces.

17 Claims, 15 Drawing Sheets

REFLECTION TYPE SCREEN

The contents of the following Chinese Utility Model application(s) are incorporated herein by reference:
201720380955.3 filed on Apr. 12, 2017

BACKGROUND

1. Technical Field

The present invention relates to a reflection type screen.

2. Related Art

Screens that reflect video image light on a reflecting layer formed on one of inclined surfaces of a convex-shaped portion, a cross section of which is triangular shape, are known (see, for example, Patent Document 1).
Patent Document 1: Japanese Patent Application Publication No. 2003-156799.

In the screen described above, the reflecting layer is formed flat on an inclined surface into which the video image light enters. At this time, if thickness of the flat reflecting layer is made uniformly increased in order to improve gain of the video image light reflected on the reflecting layer, external light such as illumination light entering from a different direction from that of the video image light is more easily reflected on the reflecting layer near the top of the convex-shaped portion. Also, on the reflecting layer near a valley portion of the convex-shaped portion, external light reflected on the other side of the inclined surface of another adjacent convex-shaped portion enters as stray light. Consequently, if the thickness of the flat reflecting layer is made uniformly increased, said stray light entering the reflecting layer can be more easily reflected. As a result, contrast of the video image light reflected on the reflecting layer gets lowered. On the contrary, if thickness of the flat reflecting layer is made uniformly decreased in order to improve the contrast of the video image light reflected on the reflecting layer, the video image light entering the reflecting layer transmits the reflecting layer more easily, resulting in gain reduction of the video image light reflected on the reflecting layer.

SUMMARY

Therefore, it is an object of an aspect of the innovations herein to provide a reflection type screen, which are capable of overcoming the above drawbacks accompanying the related art. The above and other objects can be achieved by combinations described in the claims. In one embodiment in the present invention, a reflection type screen will be provided, including a base portion which is tabular; and a plurality of prism portions which are provided on one surface of the base portion, extending in one direction and lined up in a direction intersecting the one direction, wherein the plurality of prism portions each have: a pair of surfaces, at least one of the pair of surfaces being inclined with respect to a normal direction of the one surface of the base portion and intersecting the other of the pair of surfaces; and a reflecting layer, being formed on the one of the pair of surfaces and reflecting light, and the reflecting layer includes, on the one of the pair of surfaces, a first thin portion, a thick portion and a second thin portion in this order from a side of an intersection line of the one of the pair of surfaces and the other of the pair of surfaces.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Hereinafter, some embodiments of the present invention will be described. The embodiments described below are not to limit the claimed invention. Also, all the combinations of the features described in the embodiment(s) are not necessarily essential to means provided by aspects of the invention.

Figure 1:
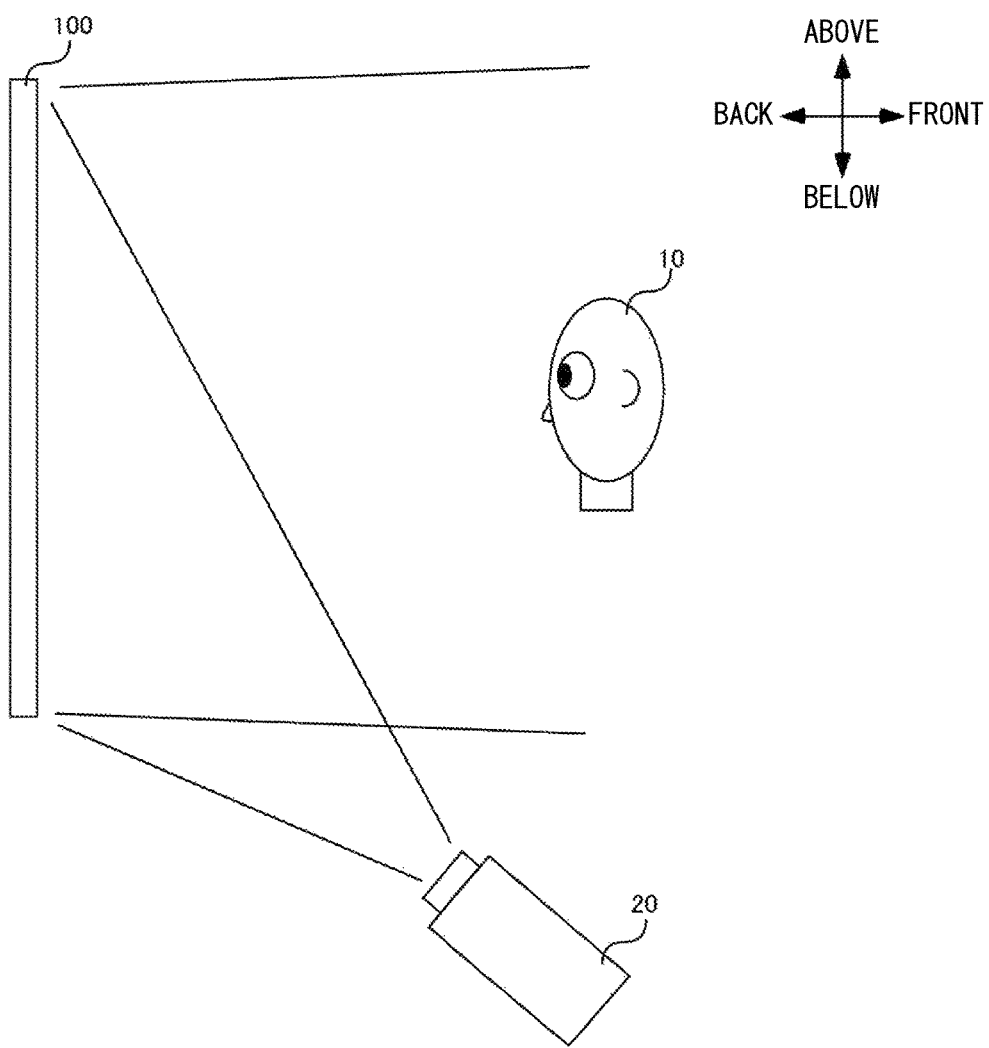
FIG. 1 shows a general configuration view of a projector system 1.

FIG. 1 shows a general configuration view of a projector system 1. In each figure hereafter, corresponding to the orientation of each configuration, the terms "above", "below", "left", "right", "front", and "back" are presented with respective arrows, and these terms will be used to describe each configuration.

As shown in FIG. 1, the projector system 1 includes a projector 20 and a reflection type screen 100. The projector 20 is located in front of and below the reflection type screen 100 and projects video image light to form a video image on the reflection type screen 100. The reflection type screen 100 reflects the video image light projected by the projector 20 in the forward direction. Thereby, the video image projected on the reflection type screen 100 can be shown to a user 10 who is in front of the reflection type screen 100.

Figure 2:
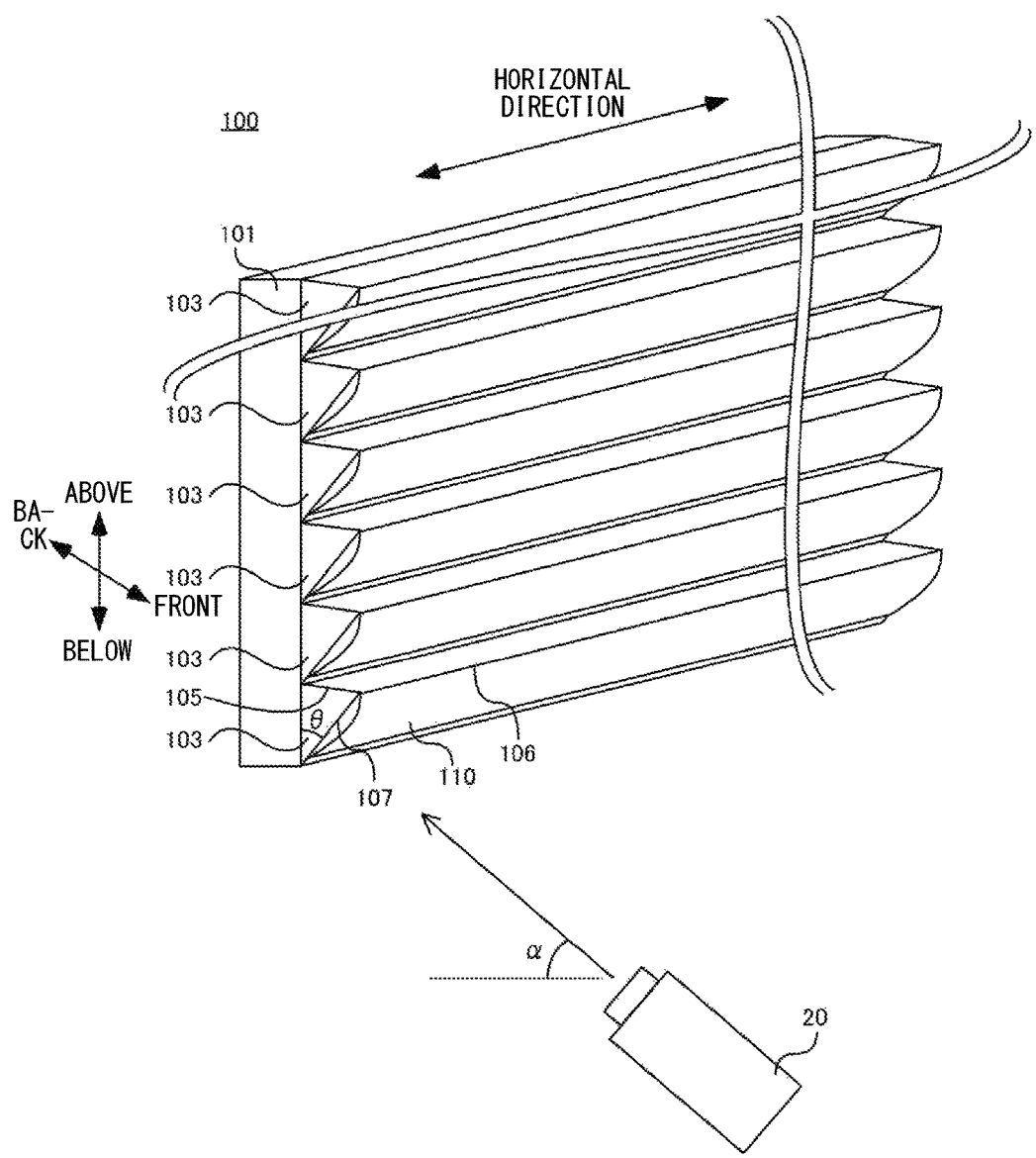
FIG. 2 shows a general perspective view of a reflection type screen 100.
Figure 3:
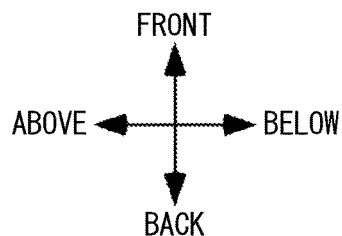
FIG. 3 shows an enlarged cross sectional view of the reflection type screen 100.
Figure 3:
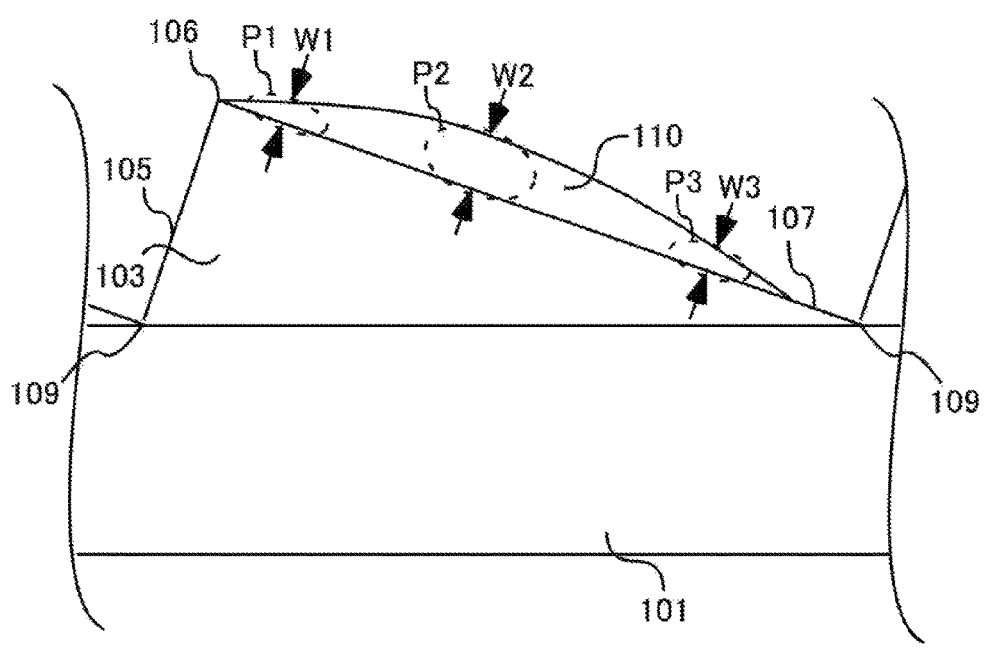

FIG. 2 shows a general perspective view of the reflection type screen 100, and FIG. 3 shows an enlarged cross sectional view of the reflection type screen 100. The reflection type screen 100 includes a base portion 101 which is tabular, and a plurality of prism portions 103 provided on one surface of the base portion.

The base portion 101 is, in the front view, formed in a square or a rectangular shape, for example a horizontally long rectangular shape. Among materials constituting the base portion 101, the binder resin is, for example: polypropylene resin, acrylic resin, epoxy resin, polycarbonate resin, polyester resin, styrene resin, acrylic-styrene copolymer resin, or urethane resin. The material constituting the base portion 101 may be material that is curable into a plate shape, or rollable and flexible sheet-like material. The base portion 101 may be transparent, or black, which is obtained by making the binder resin contain filler to absorb light, such as carbon black, black pigment particles, for example.

The plurality of prism portions 103 are provided on a front surface, which is one surface of the base portion 101. Each prism portion 103 has a triangular cross section and extends in the horizontal direction, which is one direction. The length of each prism portion 103 in the horizontal direction is the same as that of the base portion 101 in the horizontal direction. The plurality of prism portions 103 are lined up parallel to each other in the vertical direction, which is orthogonal to the horizontal direction. The term "being orthogonal" herein is one example of "intersecting". The length of each prism portion 103 in the vertical direction is approximately about 100 to 300 μm, for example. The height of each prism portion 103 in the front-back direction is approximately about 70 to 200 μm, for example. It is noted that the length of each prism portion 103 in the horizontal direction may be shorter than that of the base portion 101 in the horizontal direction.

Among materials constituting each prism portion 103, the binder resin is, like the base portion 101, for example: polypropylene resin, acrylic resin, epoxy resin, polycarbonate resin, polyester resin, styrene resin, acrylic-styrene copolymer resin, or urethane resin. Each prism portion 103, like the base portion 101, may be transparent, or black, which is obtained by making the binder resin contain filler absorb light, such as, for example, carbon black, black pigment particles into the binder resin. If a plurality of prism portions 103 and the base portion 101 are transparent, a black film may be formed on the back surface of the base portion 101, so as to absorb external light such as illumination light, by the black film. If the plurality of prism portions 103 and the base portion 101 are black, light absorptance is higher, as compared with the case where they are transparent. Therefore, at predetermined areas of the plurality of prism portions 103 and the base portion 101, external light such as illumination light entering from a different direction from the direction of the video image light, for example from a space in front of and above the reflection type screen 100 during use, can be absorbed more, which improves contrast of the video image light reflected by the reflection type screen 100. It is noted that the plurality of prism portions 103 may be formed of different materials from the material of the base portion 101, or may be formed of the same material as that of the base portion 101 integrally with the base portion 101 or separately.

The plurality of prism portions 103 each have an upper surface 105 and a lower surface 107, which are a pair of surfaces facing outward and not facing the front surface of the base portion 101. The lower surface 107 has a reflecting layer 110 to reflect light being formed on the surface thereof. The lower surface 107 is inclined with respect to the normal direction of an imaginary plane (which imaginarily does not include fine roughness) of the front surface that is one surface of the base portion 101, and faces a space in front of and below the reflection type screen 100 during use. Thereby, the lower surface 107 reflects the video image light projected by the projector 20, located in front of and below the reflection type screen 100, toward the forward direction of the reflection type screen 100 by the reflecting layer 110 formed on the surface of the lower surface 107. An angle θ between the lower surface 107 of each prism portion 103 and the imaginary plane of the base portion 101 is about 40°, for example. The angle θ is preferably the same for all the prism portions 103 in terms of simplifying the manufacturing process. On the other hand, it is preferable that the angle θ of each prism portion 103 is made different from the angles θ of the other prism portions 103 in terms of improving image quality. If the angles θ are made different among the plurality of prism portions 103, it is preferable that the angles θ are gradually varied, among the plurality of prism portions 103 adjacent to each other in the vertical direction, corresponding to an incident angle θ in the vertical direction of the video image light entering each prism portion 103 from the projector 20 located in front of and below the reflection type screen 100. θ and α preferably satisfy the relationship of "2θ=α", for example.

On the other hand, the upper surface 105 may be parallel or inclined with respect to the normal direction of the imaginary plane of the base portion 101. If inclined, the upper surface 105 faces a space in front of and above the reflection type screen 100 during use, for example. The lower surface 107 and the upper surface 105 intersect each other and form an intersection line 106.

The reflecting layer 110 is formed over the whole length, in the horizontal direction, of the lower surface 107 of each prism portion 103. The reflecting layer 110, as shown enlarged in FIG. 3, is provided at least up to a midway portion of the lower surface 107, from the intersection line 106 of the upper surface 105 and the lower surface 107, or from a region near the intersection line 106 on the lower surface 107. It is noted that the reflecting layer 110 may be provided up to a valley portion 109 which is a portion where the upper surface 105 of one prism portion 103 and the lower surface 107 of another adjacent prism portion 103 intersect.

As shown in FIG. 3, the reflecting layer 110 includes, on the lower surface 107, a first thin portion P1, a thick portion P2 and a second thin portion P3 in this order from the intersection line 106 side. The first thin portion P1, the thick portion P2 and the second thin portion P3 are smoothly continuous to each other. Here, the term "thin portion" means a portion where the thickness is smaller than the average thickness of the reflecting layer 110, and the term "thick portion" means a portion where the thickness is greater than the average thickness of the reflecting layer 110. The thickness W2 of the thick portion P2 is greater than the thickness W1 of the first thin portion P1 and the thickness W3 of the second thin portion P3. The thickness W2 of the thick portion P2 is approximately about 10 to 20 μm, for example. The thickness W1 of the first thin portion P1 and the thickness W3 of the second thin portion P3 are approximately 2 to 5 µm, for example.

The reflecting layer 110 includes binder resin and filler. Here, the terms "reflecting layer" means a layer where the reflectivity is higher than those of other components of the reflection type screen 100, for example, the plurality of prism portions 103, the base portion 101 and the like.

The binder resin is urethane resin, vinyl chloride resin, polyolefin resin, or polyester resin, for example. The filler is silica, titanium oxide, mica, barium sulphate, barium chloride, or aluminum, for example. Titanium oxide, barium sulphate and barium chloride are also referred to as white pigment.

As described above, according to the reflection type screen 100, the reflecting layer 110, being formed on the lower surface 107 of each of the plurality of prism portions 103, includes the first thin portion P1, the thick portion P2 and the second thin portion P3 in this order from the intersection line 106 side, thus the transmittance can be made relatively low at the thick portion P2 and, on the contrary, the transmittance can be made relatively high at the first thin portion P1 and the second thin portion P3. Further, the reflectivity can be relatively high on the thick portion P2, and the reflectivity is relatively low at the first thin portion P1 and the second thin portion P3. Thereby, at the thick portion P2 of the reflecting layer 110 on the lower surface 107, the video image light entering from a space in front of and below the reflection type screen 100 during use can be reflected with higher reflectivity, as compared with the video image light reflected on the flat reflecting layer having the uniform thickness which is the same as the average thickness of the reflecting layer 110. Thus, the gain of the video image light reflected by the reflection type screen 100 can be increased.

Also, according to the configuration described above, at the first thin portion P1 of the reflecting layer 110 on the lower surface 107, external light, such as illumination light entering from a space in front of and above the reflection type screen 100 during use, can be made transmitted therethrough. If at least one of both each prism portion 103 and the base portion 101 is black, external light transmitted through the first thin portion P1 can be made absorbed in at least one of both each prism portion 103 and the base portion 101. Also, if at least one of both each prism portion 103 and the base portion 101 is transparent and the black film is formed on the back surface of the base portion 101, external light transmitted through the first thin portion P1 can be made absorbed in the black film. Thereby, reflectiveness of the screen is lowered, but external light absorptance is improved. As a result, the contrast as the entire screen improves. More specifically, the contrast of the video image light reflected on the reflecting layer 110 can be made improved, as compared with the video image light reflected on a flat reflecting layer having a uniform thickness which is the same as the average thickness of the reflecting layer 110.

Also, by the configuration described above, stray light generated near the valley portion 109 can be made transmitted at the second thin portion P3 of the reflecting layer 110 on the lower surface 107. If at least one of both each prism portion 103 and the base portion 101 is black, the stray light transmitted through the second thin portion P3 can be made absorbed in the at least one of both each prism portion 103 and the base portion 101. Also, if at least one of both each prism portion 103 and the base portion 101 is transparent and the black film is formed on the back surface of the base portion 101, the stray light transmitted through the second thin portion P3 can be made absorbed in the black film. Thereby, the contrast of the video image light reflected on the reflecting layer 110 can be made more improved, as compared with the video image light reflected on a flat reflecting layer having a uniform thickness which is the same as the average thickness of the reflecting layer 110.

Figure 4:
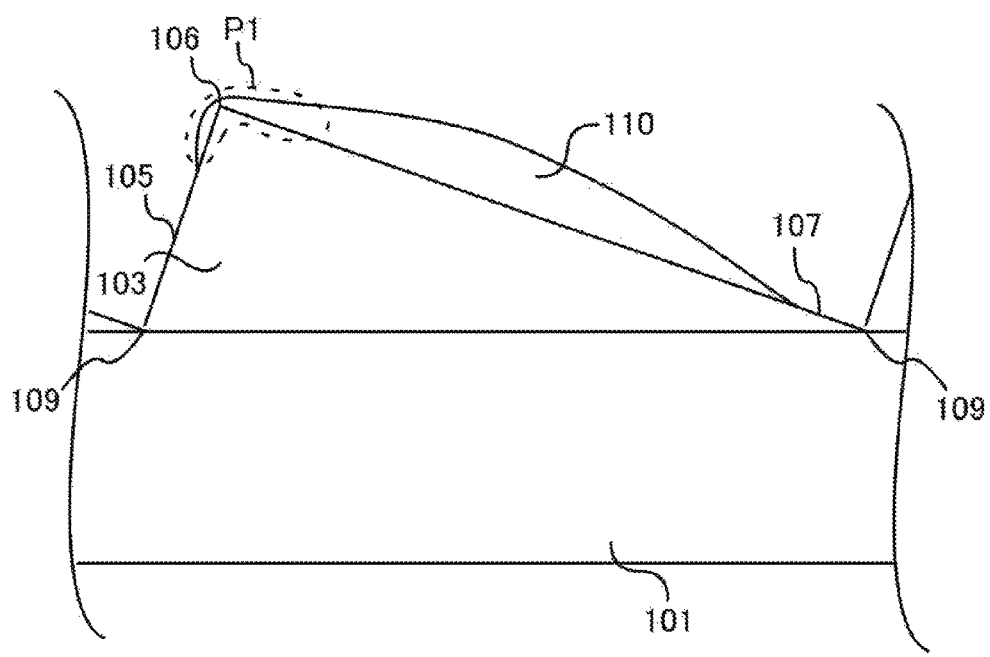
FIG. 4 shows an enlarged cross sectional view of another reflection type screen 200.

FIG. 4 shows an enlarged cross sectional view of another reflection type screen 200. In each figure hereafter, configurations having the same configuration as described in the previous embodiments are numbered with the same reference numerals. For these configurations, the explanation will not be repeated for simplicity.

The reflection type screen 200, having a configuration different from that of the reflection type screen 100, has the first thin portion P1 of the reflecting layer 110 extending up to the upper surface 105 crossing the intersection line 106 as shown in FIG. 4. If the intersection line 106 of each prism portion is exposed on the reflection type screen, light entering a region in the vicinity of the intersection line 106 specularly reflects on the surface of the region. Thus, streaks of light extending in the horizontal direction, in which the prism portion is extending, are inevitably seen on the screen surface by the user 10. On the other hand, according to the reflection type screen 200, a region in the vicinity of the intersection line 106 is completely covered by the reflecting layer 110. Thus, light entering the region in the vicinity of the intersection line 106 can be made prevented from specularly reflecting, and therefore the visibility of the video image light reflected by the reflection type screen 200 can be prevented from being lowered.

Figure 5:
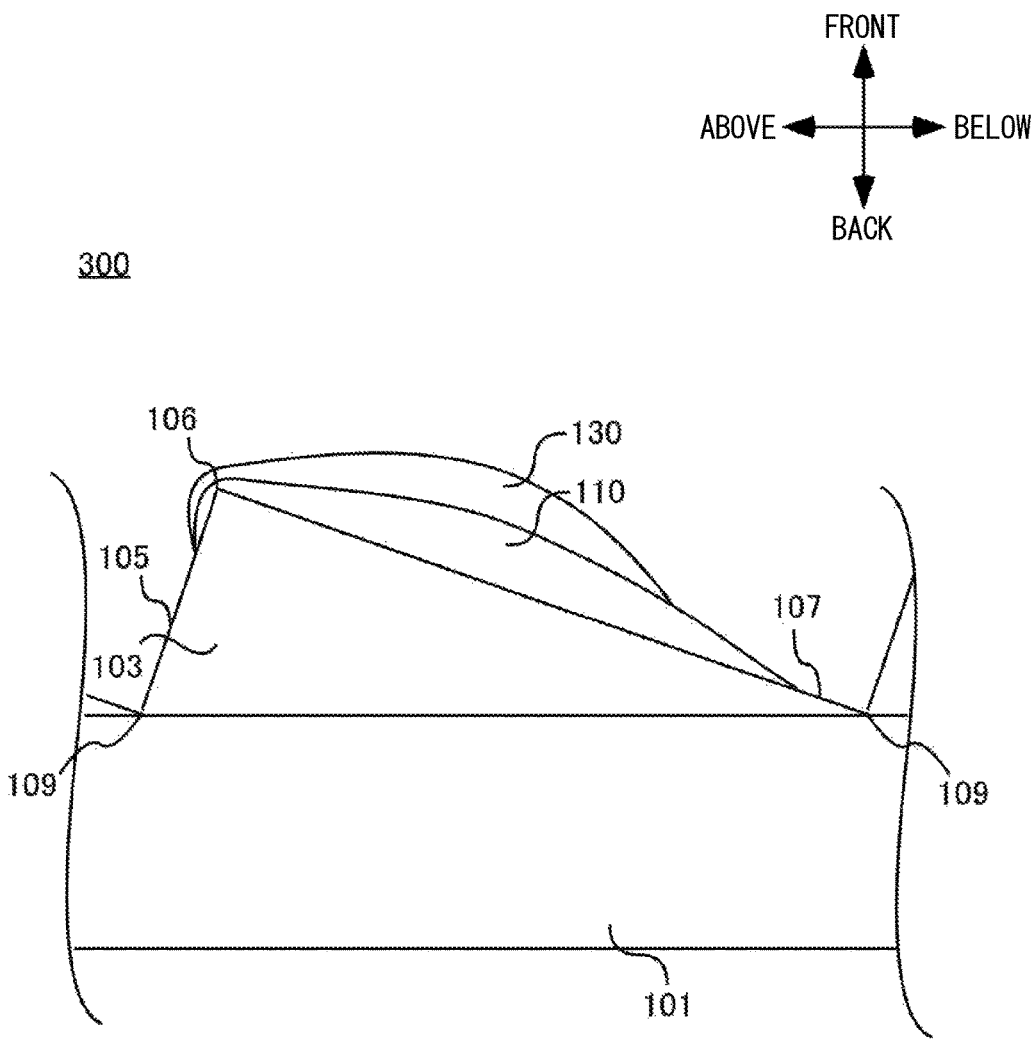
FIG. 5 shows an enlarged cross sectional view of another reflection type screen 300.

FIG. 5 shows an enlarged cross sectional view of another reflection type screen 300. The reflection type screen 300, having a configuration different from that of the reflection type screen 200, additionally includes a second reflecting layer 130 formed on the reflecting layer 110. The second reflecting layer 130 reflects the light at a narrower viewing angle than that of the reflecting layer 110. For example, the viewing angle of the reflecting layer 110 may be 80° or more and, on the other hand, a viewing angle of the second reflecting layer 130 may be 60° or less.

The second reflecting layer 130, like the reflecting layer 110, may be formed over the whole length, in the horizontal direction, of the lower surface 107 of each prism portion 103. The second reflecting layer 130, as shown in FIG. 5, may be provided from an end portion of the upper surface 105 side on the reflecting layer 110 up to a midway portion of the reflecting layer 110, in a direction from the upper surface 105 to the lower surface 107. The second reflecting layer 130, as shown in FIG. 5, may be shorter than the reflecting layer 110 in the vertical direction, but it covers at least a part of the thick portion P2 of the reflecting layer 110. The second reflecting layer 130, like the reflecting layer 110, on the reflecting layer 110, may include the first thin portion, the thick portion and the second thin portion in this order from the intersection line 106 side. In this case, the first thin portion, the thick portion and the second thin portion are smoothly continuous to each other. The thickness of the thick portion, like the thick portion P2 of the reflecting layer 110, is approximately about 10 to 20 µm, for example. Also, the thickness of the first thin portion and the thickness of the second thin portion, like the thickness W1 of the first thin portion P1 and the thickness W3 of the second thin portion P3 of the reflecting layer 110, are approximately 2 to 5 µm, for example.

The second reflecting layer 130 includes binder resin and filler. The binder resin, like the binder resin of the reflecting layer 110, is urethane resin, vinyl chloride resin, polyolefin resin, or polyester resin, for example. The filler is lustrous pigment which is coated thinly with titanium oxide or titanium dioxide on a surface of pulverized mica. Here, pearl pigment is used as the lustrous pigment. It is noted that, as an alternative to the pearl pigment, silver flakes, for example aluminum flakes, may be used, which is powder having the similar characteristic to that of pearl pigment.

Figure 6:
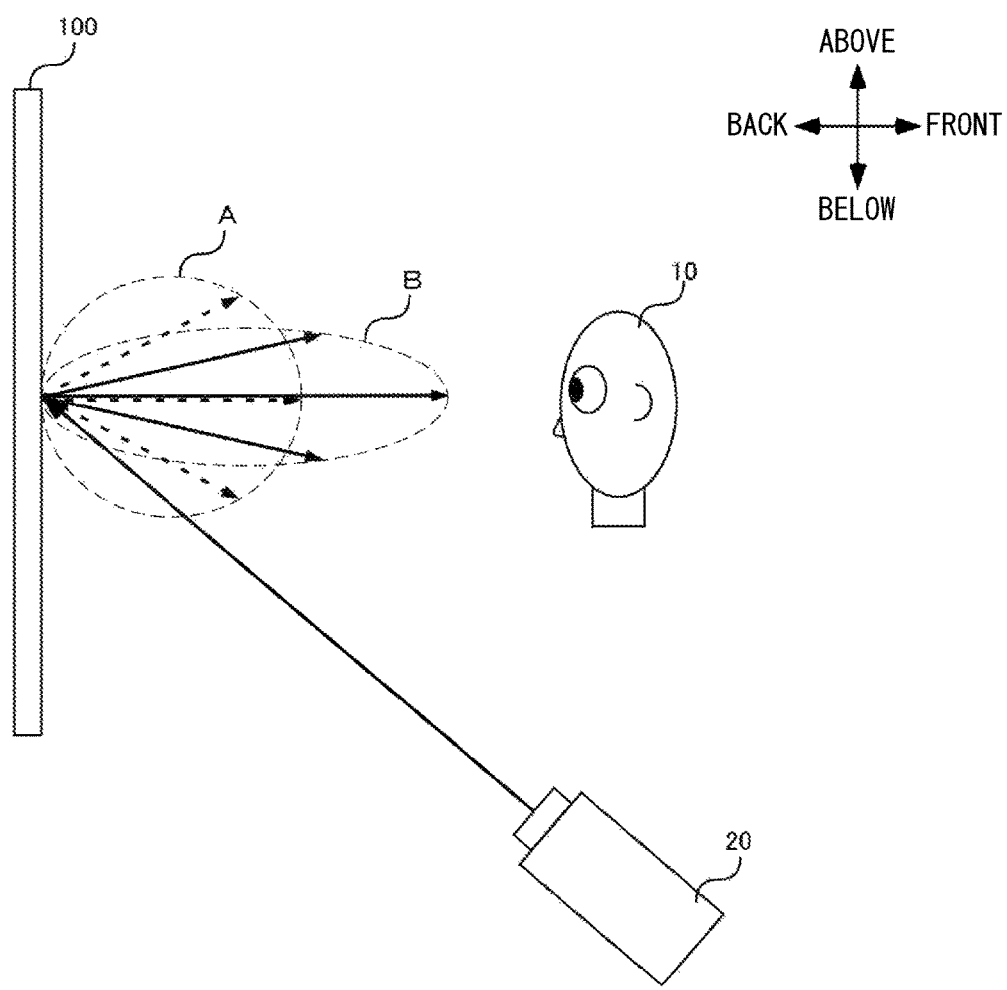
FIG. 6 shows an explanatory view to describe how to spread of video image light reflected on a surface of the reflection type screen 300, viewed from the horizontal direction.
Figure 7:
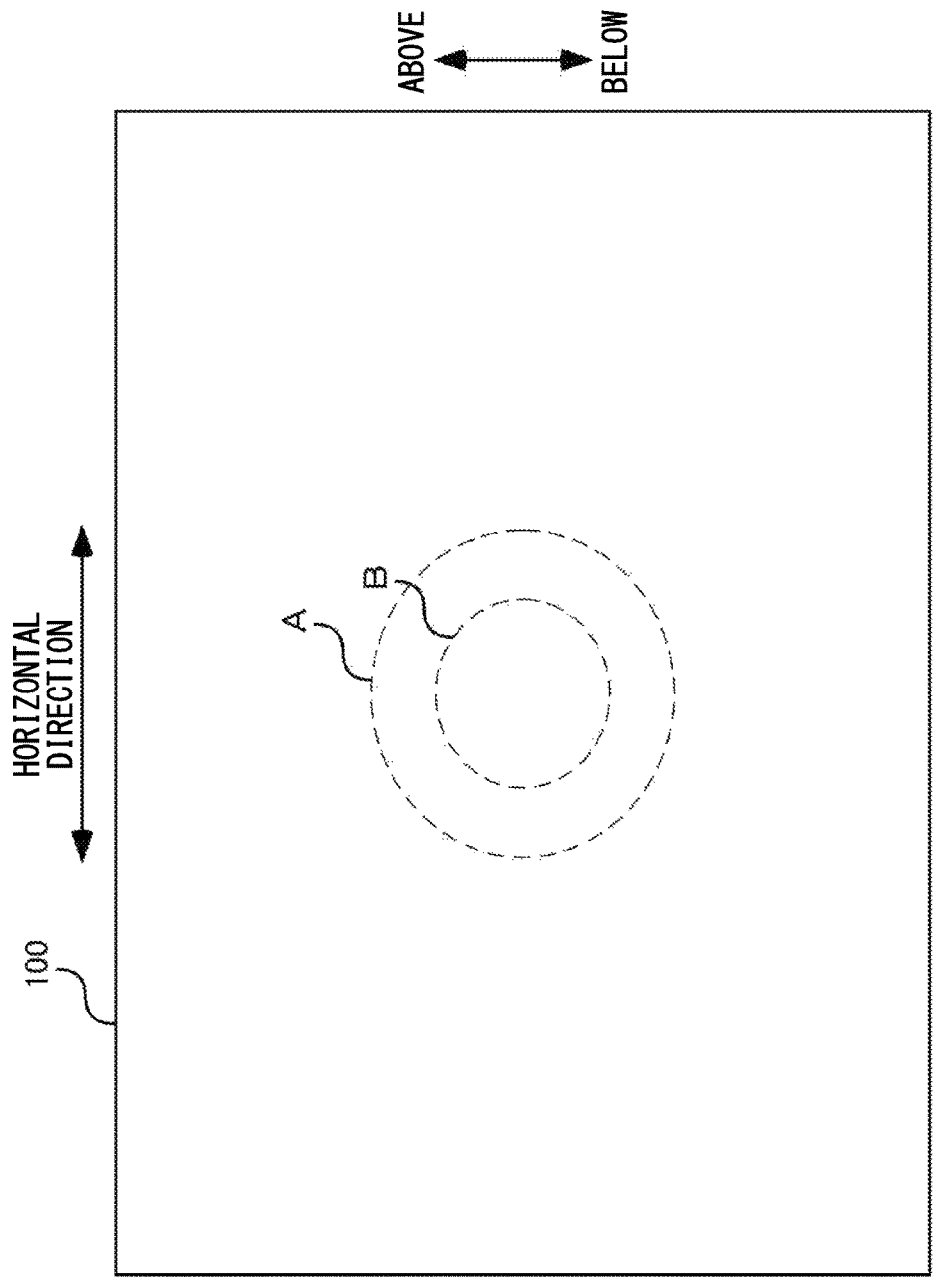
FIG. 7 shows an explanatory view to describe how to spread of the video image light reflected on the surface of the reflection type screen 300, viewed from the front-back direction.

Here, now referring to FIG. 6 and FIG. 7, the difference in how to spread between video image light reflected on the reflecting layer 110 including the white pigment as the filler and video image light reflected on the second reflecting layer 130 including the lustrous pigment will be described. FIG. 6 shows an explanatory view to describe how to spread of video image light reflected on the surface of the reflection type screen 300, viewed from the horizontal direction, and FIG. 7 shows an explanatory view to describe how to spread of video image light reflected on the surface of the reflection type screen 300, viewed from the front-back direction. In FIG. 6, schematically, the video image light entering into the surface of the reflection type screen 300 from the projector 20 is represented by solid line arrows, the video image light reflected on the reflecting layer 110 including white pigment on the surface of the reflection type screen 300 is represented by dashed line arrows, and the video image light reflected on the second reflecting layer 130 including the lustrous pigment on the surface of the reflection type screen 300 is represented by solid line arrows. Also, in FIG. 6 and FIG. 7, a region A represented by a dashed line depicts how to spread of the video image light reflected on the reflecting layer 110 including the white pigment, and a region B represented by another dashed line depicts how to spread of the video image light reflected on the second reflecting layer 130 including the lustrous pigment. It is noted that, in FIG. 6 and FIG. 7, the plurality of prism portion 103, the reflecting layer 110, the second reflecting layer 130 and the like in the reflection type screen 300 are not illustrated for simplicity of description.

As shown in FIG. 7, viewed from the front-back direction, the how to spread of the video image light reflected on the second reflecting layer 130 including the lustrous pigment, like the how to spread of the video image light reflected by the reflecting layer 110 including the white pigment, is isotropic in the horizontal direction and the vertical direction. However, as shown in FIG. 6, viewed from the horizontal direction, the video image light reflected on the second reflecting layer 130 including the lustrous pigment has directivity and the light strength varies in the front-back direction. Thus, a spreading angle of the video image light in the horizontal direction and the vertical direction is narrower in the case where the video image light is reflected on the second reflecting layer 130 including the lustrous pigment than in the case where the video image light is reflected on the reflecting layer 110 including the white pigment. Thus, the second reflecting layer 130 including the lustrous pigment has a narrower viewing angle than that of the reflecting layer 110 including the white pigment. It is noted that the second reflecting layer 130 may include the white pigment, in addition to the lustrous pigment, in order to control the viewing angle.

Also, the second reflecting layer 130 including the lustrous pigment has higher transmittance than that of the reflecting layer 110 including the white pigment. Transmittance of the reflecting layer 110 including the white pigment is approximately about 20%, and, on the other hand, transmittance of the second reflecting layer 130 including the lustrous pigment is about 30 to 40%. Thus, the second reflecting layer 130 including the lustrous pigment transmits more light than the reflecting layer 110 including the white pigment. It is noted that light having been transmitted through the second reflecting layer 130 is reflected on the reflecting layer 110 underneath the second reflecting layer 130.

As described above, according to the reflection type screen 300, the second reflecting layer 130 having a narrower viewing angle than that of the reflecting layer 110 is formed so as to cover at least the thick portion P2 of the reflecting layer 110 on the reflecting layer 110. As shown in FIG. 6, the second reflecting layer 130 can reflect the video image light more intensively in the direction to the user 10 than the reflecting layer 110, by having a narrower viewing angle than that of the reflecting layer 110. Thereby, the gain of the video image light reflected by the reflection type screen 300, particularly reflected on the reflecting layer 110 and the second reflecting layer 130 around the center of the lower surface 107 of each prism portion 103 can be improved.

However, the second reflecting layer 130 has optical directivity and thus the uniformity of luminance on the screen surface becomes lowered. Specifically, it is brighter around the center of the screen surface, whereas it is darker at the both sides of the screen surface in the horizontal direction. However, it has been confirmed that the screen can be practically used with this degree of darkening in the horizontal direction. The reflection type screen 300 is not very appropriate for a laterally spread space such as a class room in terms of the uniformity of luminance, whereas it is appropriate for a space, such as home theater, where the user 10 is positioned opposite to the screen in terms of its high gain.

It is noted that, preferably, the second reflecting layer 130 does not cover or covers only a part of the first thin portion P1 and the second thin portion P3 of the reflecting layer 110, and covers entirely the thick portion P2 of the reflecting layer 110. Thereby, while the gain of the reflection type screen 300 is improved by enhancing reflectivity of the video image light around the center of the lower surface 107 of each prism portion 103, the contrast of the reflection type screen 300 can be improved by enhancing light absorptance of external light near the intersection line 106 and near the valley portion 109 of the lower surface 107. Also, as compared with the case with the second reflecting layer 130 covering entirely the first thin portion P1 and the second thin portion P3 of the reflecting layer 110, production cost of the reflection type screen 300 can be reduced by reducing the printing amount of the second reflecting layer 130.

Figure 8:
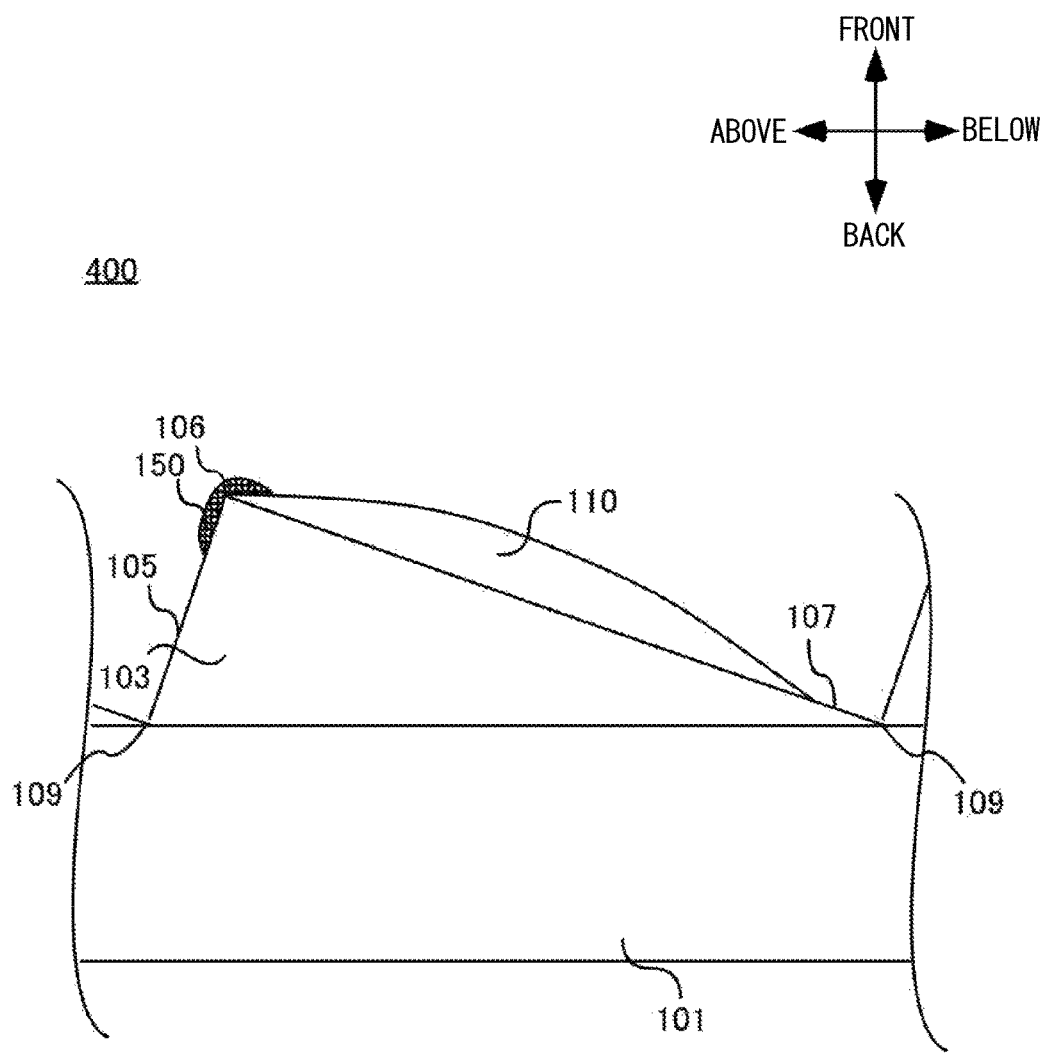
FIG. 8 shows an enlarged cross sectional view of another reflection type screen 400.

FIG. 8 shows an enlarged cross sectional view of another reflection type screen 400. The reflection type screen 400, having a configuration different from that of the reflection type screen 100, additionally includes a light-absorbing layer 150 to absorb light formed on the upper surface 105.

The light-absorbing layer 150 extends up to the lower surface 107 crossing the intersection line 106 and covers only a part of the reflecting layer 110. Preferably, the light-absorbing layer 150 covers only an end portion on the upper surface 105 side of the reflecting layer 110. Further preferably, the light-absorbing layer 150 covers only the first thin portion P1 of the reflecting layer 110, and does not cover the thick portion P2 and the second thin portion P3 of the reflecting layer 110. The thickness of the light-absorbing layer 150 is approximately about 5 to 10 μm, for example.

The light-absorbing layer 150 is formed over the whole length of the upper surface 105 and the lower surface 107 in the horizontal direction in which each prism portion 103 extends. As shown in FIG. 6, the light-absorbing layer 150 may be formed, on the upper surface 105, from the intersection line 106 up to a midway portion of the upper surface 105 or up to the valley portion 109 of the upper surface 105. It is noted that if the reflecting layer 110 is formed on the lower surface 107 being spaced apart from the intersection line 106, the light-absorbing layer 150 may or may not cover the reflecting layer 110.

The light-absorbing layer 150 includes binder resin and filler. The binder resin, like the binder resin of the reflecting layer 110, is urethane resin, vinyl chloride resin, polyolefin resin, or polyester resin, for example. The filler is carbon black or black pigment particles, for example.

As described above, according to the reflection type screen 400, external light entering a region in the vicinity of the intersection line 106 of each prism portion 103 is absorbed by the light-absorbing layer 150, which improves the contrast of the video image light reflected by the reflection type screen 400. Also, a configuration is provided to reflect the video image light entering at the center of the lower surface 107 of each prism portion 103 on the reflecting layer 110 without being shaded by the light-absorbing layer 150, therefore gain reduction of the video image light reflected by the reflection type screen 400 can be made prevented, as compared with the reflection type screen 100. It is noted that the reflection type screen 400 may alternatively have a configuration such that the reflecting layer 110 crosses the intersection line 106 and extends up to the upper surface 105 side.

Figure 9:
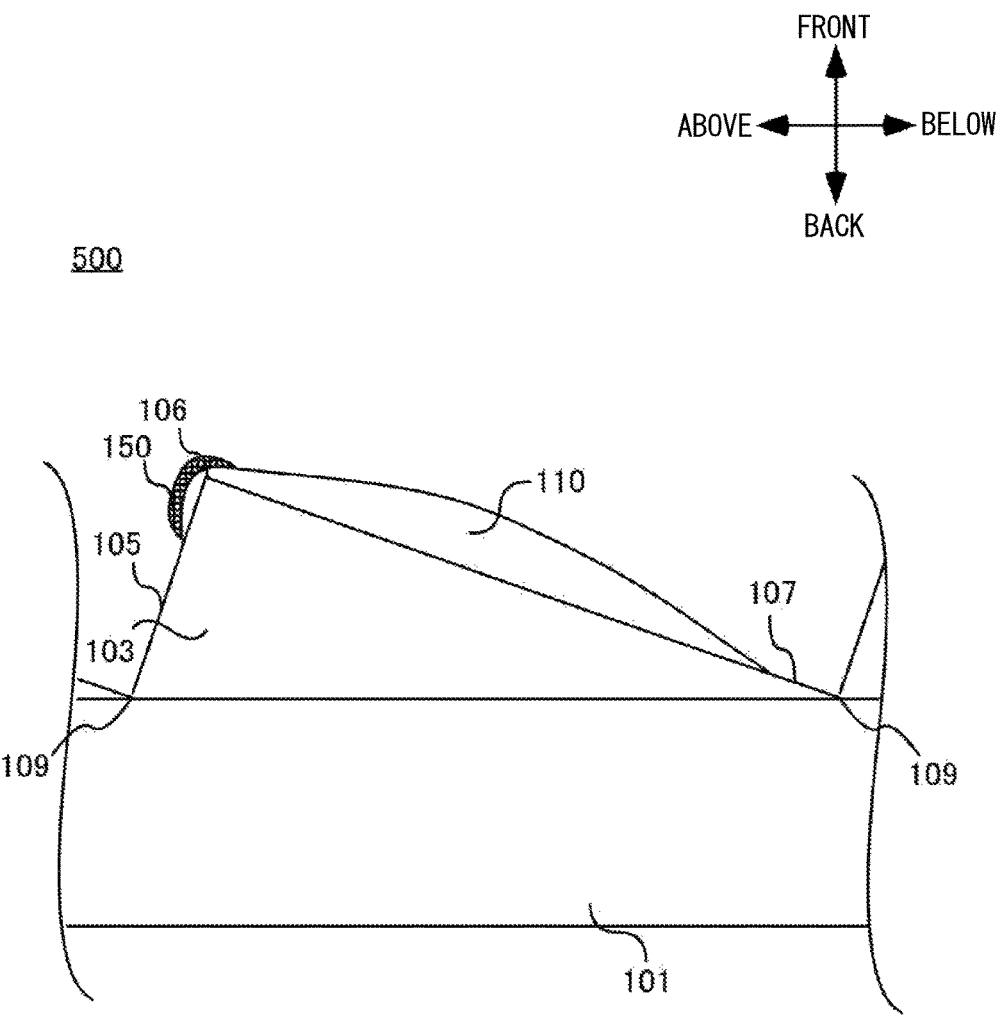
FIG. 9 shows an enlarged cross sectional view of another reflection type screen 500.

FIG. 9 shows an enlarged cross sectional view of another reflection type screen 500. The reflection type screen 500, having a configuration different from that of the reflection type screen 200, has the light-absorbing layer 150 without being formed on the upper surface 105 but being formed to cover the end portion on the upper surface 105 side of the reflecting layer 110 in the vertical direction. Also, the light-absorbing layer 150 is shorter than the reflecting layer 110 in the vertical direction. It is noted that if the reflecting layer 110 is not extending up to the upper surface 105 crossing the intersection line 106, the light-absorbing layer 150 may be formed on the upper surface 105 side on the lower surface 107 without covering the reflecting layer 110. In this case, preferably, the light-absorbing layer 150 extends from the intersection line 106 to the adjacenting lower surface 107 side, so as to cover the top of each prism portion 103 including the intersection line 106. Thereby, it can be prevented that the light is specularly reflected at the top of each prism portion 103, which causes reduction of visibility of the user 10.

Figure 10:
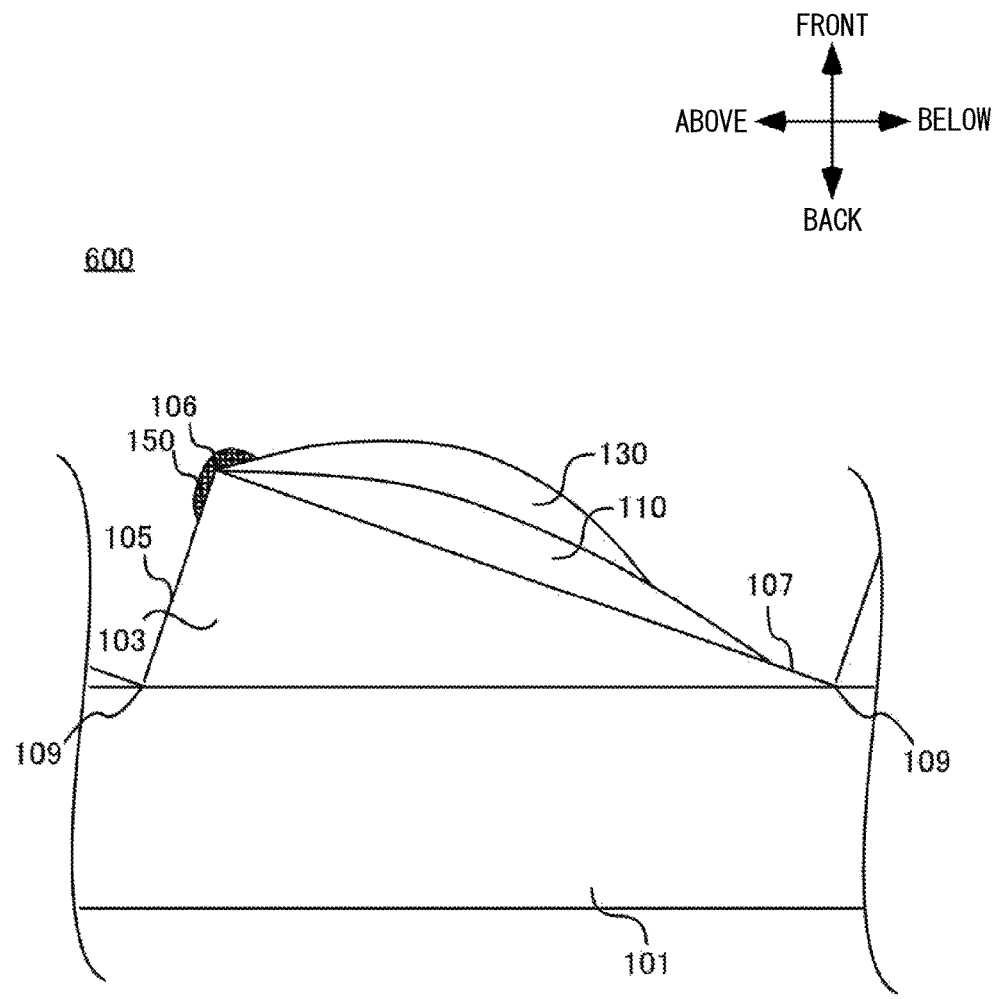
FIG. 10 shows an enlarged cross sectional view of another reflection type screen 600.

FIG. 10 shows an enlarged cross sectional view of another reflection type screen 600. The reflection type screen 600, having a configuration different from that of the reflection type screen 400, has the second reflecting layer 130 formed on the reflecting layer 110, and further the light-absorbing layer 150 formed on the upper surface 105 extending up to the lower surface 107, and is formed so as to cover the end portion on the upper surface 105 side of the second reflecting layer 130 in the vertical direction. Thus, the reflection type screen 600, as compared with the reflection type screen 400, can prevent gain reduction due to providing the light-absorbing layer 150 with the second reflecting layer 130. It is noted that if the second reflecting layer 130 does not cover the end portion of the reflecting layer 110 on the upper surface 105 side and said end portion is exposed, the light-absorbing layer 150 may be formed such as to cover the end portion on the upper surface 105 side of at least one of the reflecting layer 110 and the second reflecting layer 130. Also, if both of the reflecting layer 110 and the second reflecting layer 130 are formed spaced apart from the intersection line 106, the light-absorbing layer 150 may or may not cover either one or both of the reflecting layer 110 and the second reflecting layer 130.

Figure 11:
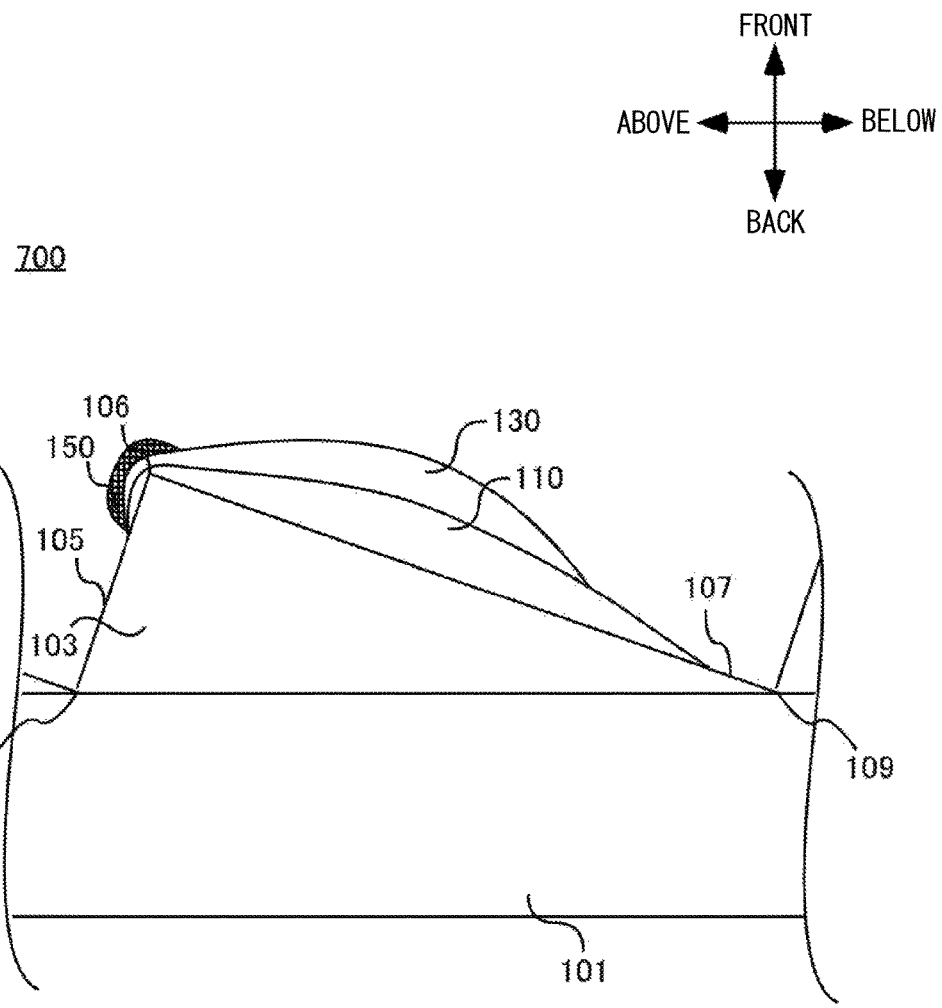
FIG. 11 shows an enlarged cross sectional view of another reflection type screen 700.

FIG. 11 shows an enlarged cross sectional view of another reflection type screen 700. The reflection type screen 700, having a configuration different from that of the reflection type screen 500, has the second reflecting layer 130 formed on the reflecting layer 110, and further the light-absorbing layer 150 is not formed on the upper surface 105, but is formed so as to cover the end portion on the upper surface 105 side of the second reflecting layer 130 in the vertical direction. Also, the light-absorbing layer 150 is shorter than the second reflecting layer 130 in the vertical direction. Thus, in each prism portion 103, the second reflecting layer 130, being shorter than the reflecting layer 110 in vertical direction, is formed on the reflecting layer 110 being formed from the lower surface 107 up to the upper surface 105 crossing the intersection line 106, the light-absorbing layer 150, being shorter than the second reflecting layer 130 in the vertical direction, is formed on the second reflecting layer 130, and the reflecting layer 110, the second reflecting layer 130 and the light-absorbing layer 150, are being formed stepwise. It is noted that if the reflecting layer 110 and the second reflecting layer 130 are not extending up to the upper surface 105 crossing the intersection line 106, the light-absorbing layer 150 may be formed on the upper surface 105 side of the lower surface 107 without covering either one or both of the reflecting layer 110 and the second reflecting layer 130.

Figure 12:
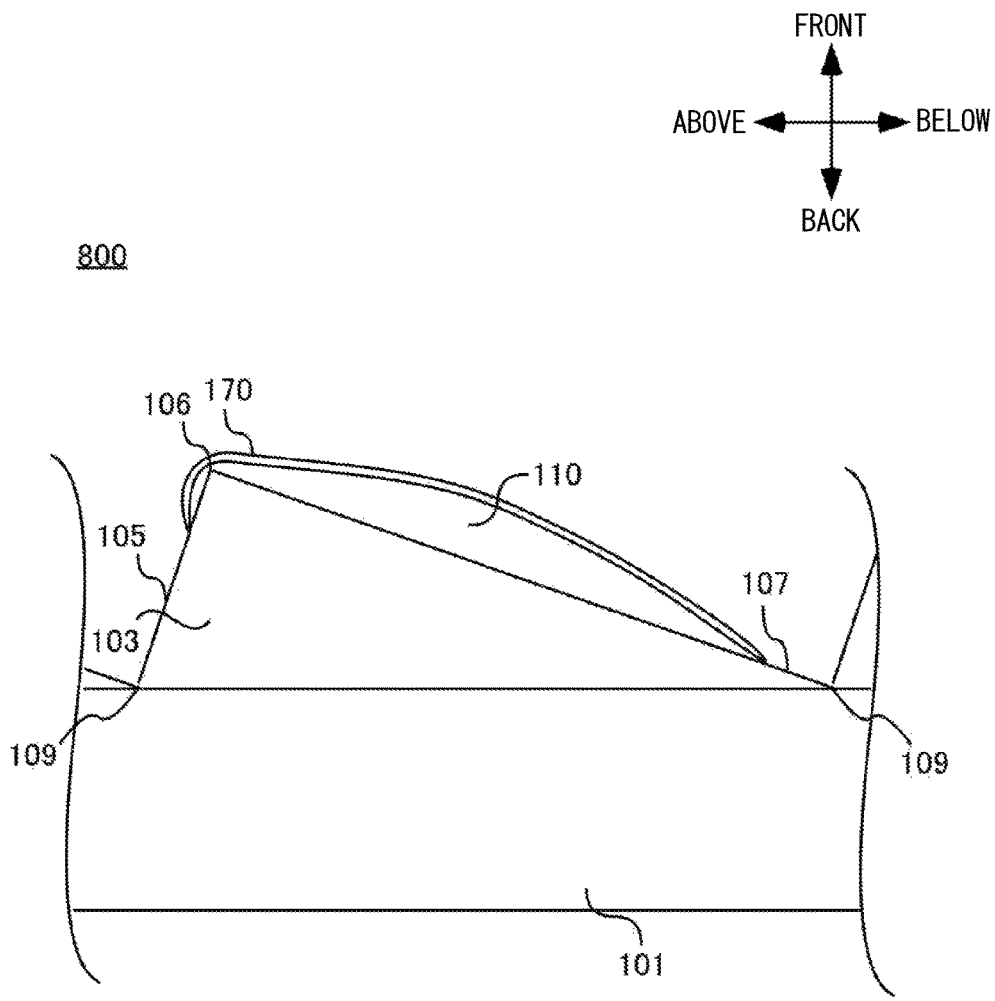
FIG. 12 shows an enlarged cross sectional view of another reflection type screen 800.

FIG. 12 shows an enlarged cross sectional view of another reflection type screen 800. The reflection type screen 800, having a configuration different from that of the reflection type screen 200, additionally includes a low friction layer 170 being formed on the reflecting layer 110 and having lower friction coefficient than that of the reflecting layer 110.

The low friction layer 170 includes the binder resin and the slip agent. In other words, the low friction layer 170 has the slip agent, being dispersed over within the binder resin. The low friction layer 170 reduces friction on surface of the light-absorbing layer 150 and makes the light-absorbing layer 150 more slippery. Thereby, as compared with the case where the light-absorbing layer is not coated with the low friction layer 170, resistance against scratch from outside of the light-absorbing layer 150 can be made improved, that is, the reflecting layer 110 can be made scratch-resistant.

The binder resin is urethane resin, vinyl chloride resin, polyolefin resin, or polyester resin, for example. The filler is silica, titanium oxide, mica, barium sulphate, barium chloride, or aluminum, for example. The slip agent is slippery due to its low surface tension, and is silicone resin, silicone oil, or fluorine-based resin, for example. The slip agent made of such materials often has higher transmittance than that of the binder resin and the filler made of each material described above, and has little effect on reflectiveness etc. of the reflecting layer 110.

As described above, according to the reflection type screen 800, like the reflection type screen 200, the contrast and the gain of the video image light reflected on the reflecting layer 110 can be improved, as compared with the video image light reflected on a flat reflecting layer having the uniform thickness which is the same as the average thickness of the reflecting layer 110. Further, as compared with the case not including the low friction layer 170 therein, the resistance against scratch from outside of the reflecting layer 110 can be improved. It is noted that the low friction layer 170, as shown in FIG. 12, may be formed only on the reflecting layer 110 or may be overcoated so as to cover partially or entirely the upper surface 105 and the lower surface 107 of each prism portion 103.

Figure 13:
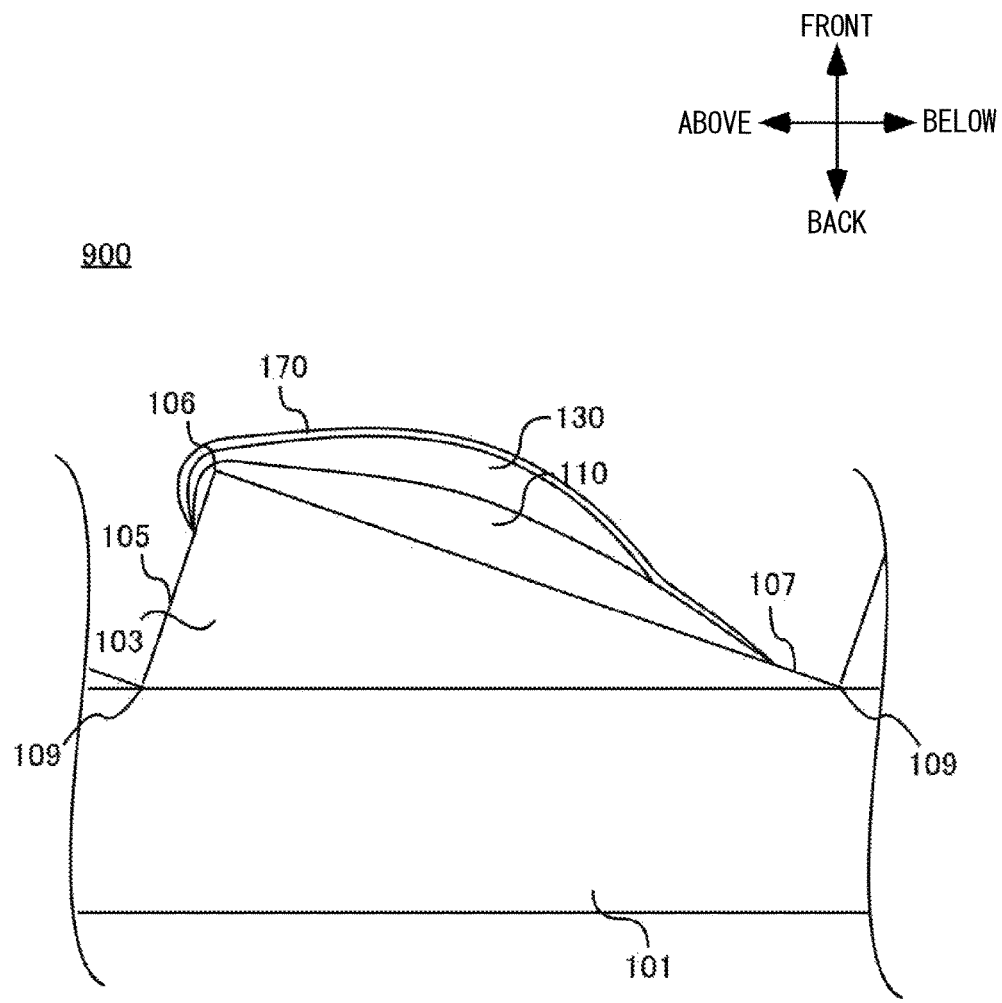
FIG. 13 shows an enlarged cross sectional view of another reflection type screen 900.

FIG. 13 shows an enlarged cross sectional view of another reflection type screen 900. The reflection type screen 900, having a configuration different from that of the reflection type screen 300, additionally includes the low friction layer 170 being formed on the second reflecting layer 130 and having lower friction coefficient than those of the reflecting layer 110 and the second reflecting layer 130. As shown in FIG. 13, the low friction layer 170 may be formed on the reflecting layer 110 on which the second reflecting layer 130 is not formed. According to the reflection type screen 900, like the reflection type screen 300, the gain of the video image light reflected by the reflection type screen 900 can be significantly improved by thickness configuration of the reflecting layer 110 and the second reflecting layer having the optical directivity, and further, the resistance against scratch of the reflecting layer 110 and the second reflecting layer 130 can be improved. It is noted that the low friction layer 170, as shown in FIG. 13, may be formed only on the reflecting layer 110 and the second reflecting layer 130, may be formed only on either one of the reflecting layer 110 and the second reflecting layer 130, or may be overcoated so as to cover partially or entirely the upper surface 105 and the lower surface 107 of each prism portion 103.

Figure 14:
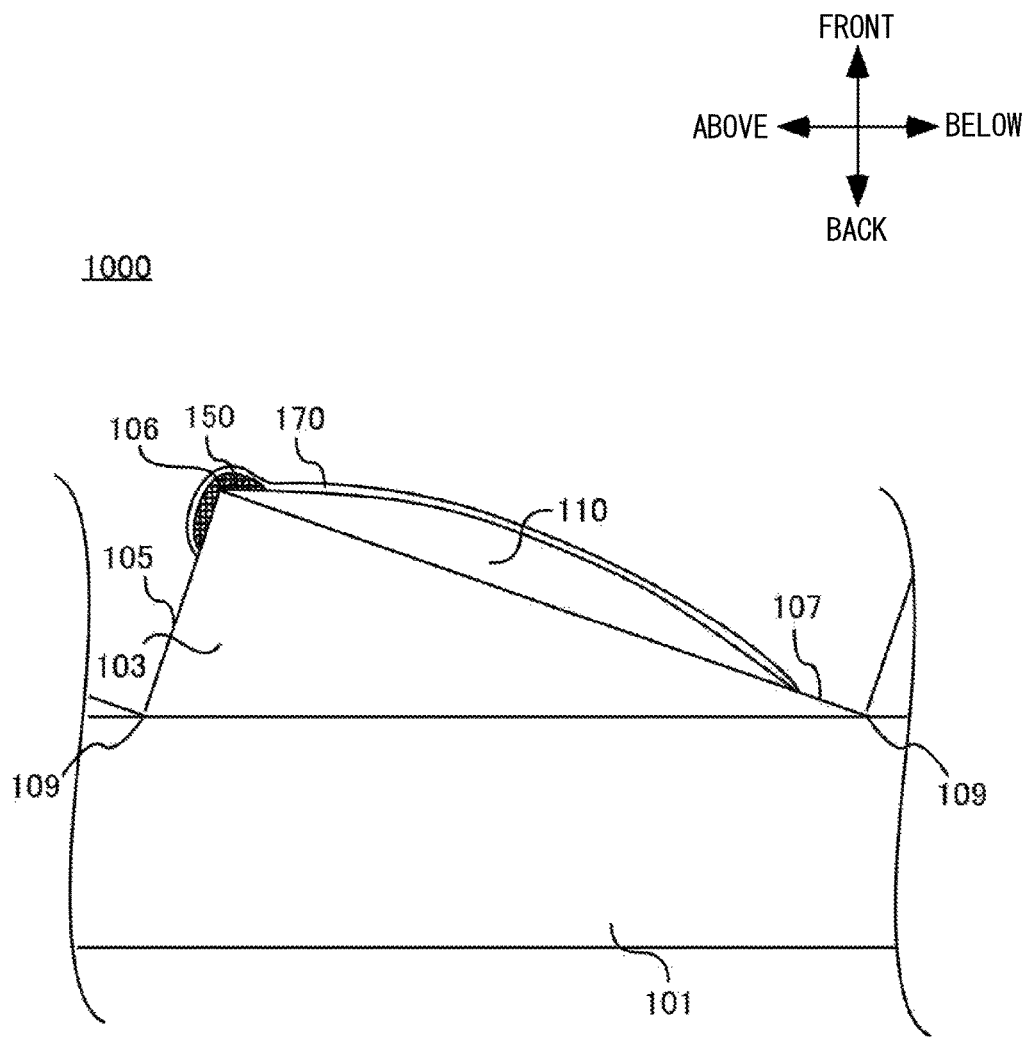
FIG. 14 shows an enlarged cross sectional view of another reflection type screen 1000.

FIG. 14 shows an enlarged cross sectional view of another reflection type screen 1000. The reflection type screen 1000, having a configuration different from that of the reflection type screen 400, is formed on the reflecting layer 110 and the light-absorbing layer 150, and includes the low friction layer 170 having lower friction coefficient than those of the reflecting layer 110 and the light-absorbing layer 150. It is noted that the low friction layer 170 may be formed only on the reflecting layer 110 and the light-absorbing layer 150, may be formed only on either one of the reflecting layer 110 and the light-absorbing layer 150 or may be overcoated so as to cover partially or entirely the upper surface 105 and the lower surface 107 of each prism portion 103. Also, if the reflecting layer 110 is formed spaced apart from the intersection line 106 on the lower surface 107, the light-absorbing layer 150 may be formed so as not to cover the reflecting layer 110, or, in this case, the low friction layer 170 may be formed on the light-absorbing layer 150 and the reflecting layer 110 integrally, or separately. Also, if the reflecting layer 110 extends up to the upper surface 105 side crossing the intersection line 106, the reflecting layer 110, the light-absorbing layer 150 and the low friction layer 170 may be formed in this order at the top of each prism portion 103.

Figure 15:
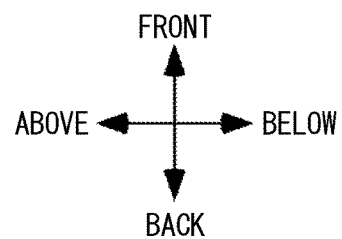
FIG. 15 shows an enlarged cross sectional view of another reflection type screen 1100.
Figure 15:
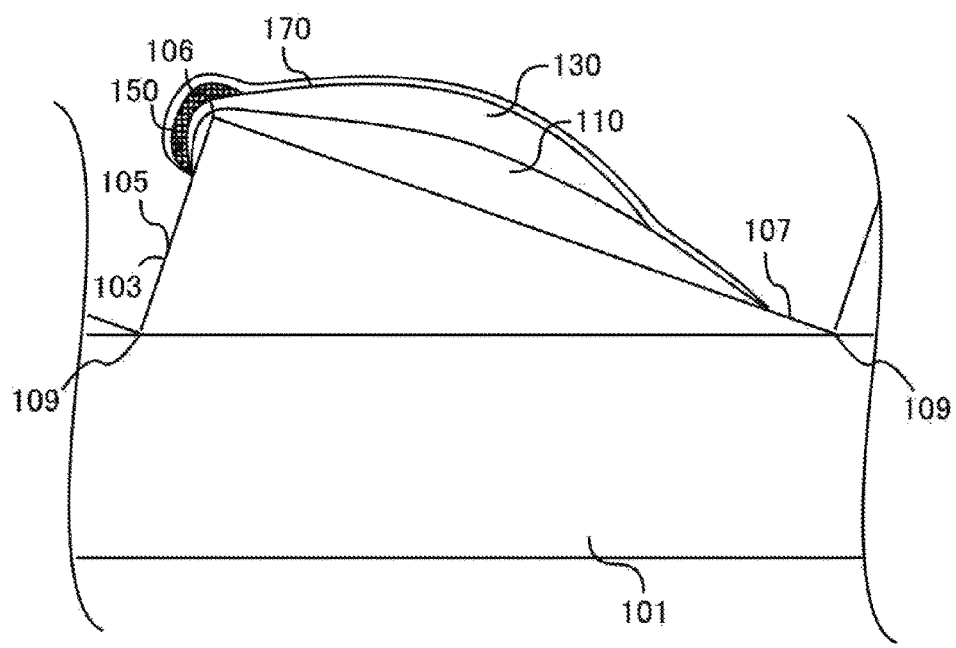

FIG. 15 shows an enlarged cross sectional view of another reflection type screen 1100. The reflection type screen 1100, having a configuration different from that of the reflection type screen 700, is formed on the second reflecting layer 130 and the light-absorbing layer 150, and includes the low friction layer 170 having lower friction coefficient than those of the reflecting layer 110, the second reflecting layer 130 and the light-absorbing layer 150. As shown in FIG. 15, the low friction layer 170 may be formed on the reflecting layer 110 on which the second reflecting layer 130 is not formed. It is noted that the low friction layer 170 may be formed only on the reflecting layer 110, the second reflecting layer 130 and the light-absorbing layer 150, may be formed only on any of the reflecting layer 110, the second reflecting layer 130 and the light-absorbing layer 150, or may be overcoated so as to cover partially or entirely the upper surface 105 and the lower surface 107 of each prism portion 103. Also, if the reflecting layer 110 is formed on the lower surface 107 being spaced apart from the intersection line 106, the light-absorbing layer 150 may also be formed on the upper surface 105. Also, if the reflecting layer 110 is formed spaced apart from the intersection line 106 on the lower surface 107, the light-absorbing layer 150 is not formed on the upper surface 105 and may be formed, on the upper surface 105 side of the lower surface 107, so as not to cover both the reflecting layer 110 and the second reflecting layer 130, may be formed so as to cover only a part of the second reflecting layer 130 without covering the reflecting layer 110, may be formed so as to cover only a part of the reflecting layer 110 without covering the second reflecting layer 130, or may be formed so as to cover only a part of the both the reflecting layer 110 and the second reflecting layer 130. In any of these cases, the low friction layer 170 may be formed on each layer integrally, or separately.

In a plurality of embodiments above, the reflecting layer and the second reflecting layer of each prism portion may each include, as an alternative to the low friction layer, the slip agent having lower friction coefficient than those of the reflecting layer and the second reflecting layer. In other words, the reflecting layer and the second reflecting layer may each include the reflecting portion to reflect light, and the low friction portion having lower friction coefficient than that of the reflecting portion dispersed over within the reflecting portion. Also, similarly, the light-absorbing layer of each prism portion may include the slip agent having the lower friction coefficient than that of the light-absorbing layer, as an alternative to the low friction layer. In other words, the light-absorbing layer may include the light-absorbing portion to absorb light and a second low friction portion having lower friction coefficient than that of the light-absorbing layer dispersed over within the light-absorbing portion. If the reflecting layer, the second reflecting layer and the light-absorbing layer each include the slip agent instead of providing the low friction layer, the manufacturing process can be reduced by eliminating the process of printing the low friction layer.

Also, if the reflecting layer includes the slip agent and transmittance of the slip agent is higher than that of the reflecting portion, external light and stray light can transmit thorough the first thin portion P1 and the second thin portion P3 more, and thus the contrast of the video image light reflected by the reflection type screen can be improved. However, if the reflecting layer includes slip agent having high transmittance, reflectivity of the reflecting layer tends to be lowered, and thus the gain of the video image light reflected by the reflection type screen may be lowered, as compared with the case where the reflecting layer does not include the slip agent having high transmittance.

Example 1

As an example 1, a reflection type screen which has the same configuration as the reflection type screen 700 shown in FIG. 11 is prepared. Each prism portion 103 and the base portion 101 of the reflection type screen in the example 1 are black.

Example 2

As an example 2, a reflection type screen which has the same configuration as the reflection type screen 300 shown in FIG. 5 is prepared. Each prism portion 103 and the base portion 101 of the reflection type screen in the example 2 are also black.

Comparative Example

As a comparative example, a reflection type screen which has the same configuration as the reflection type screen in the example 1, except that the reflecting layer thereof has a uniform thickness which is approximately similar to that of the average of the reflecting layer of each reflection type screen of the example 1 and the example 2 and that the second reflecting layer is not included, is prepared. Each prism portion and the base portion of the reflection type screen in the comparative example are also black.

The gain values were measured using the reflection type screen in the comparative example, the reflection type screen in the example 1 and the reflection type screen in the example 2, in order to confirm that the gain gets improved by thickness configuration and formation of the second reflecting layer in each reflecting layer of the reflection type screens in the example 1 and the example 2. A measurement method of the gain value consists of the procedures [1] to [3] described below.

[1] Projecting the white video image on the screen from the projector. Measuring brightness at the center of the screen by a luminance meter (a measured value to be referred to as I [cd/m$^2$]).

[2] Projecting a white video image on the screen from the projector in a darkened room. Measuring projector illuminance at the center of the screen by the luminometer (a measured value to be referred to as E [lx]).

[3] Defining a value obtained by dividing I by a value obtained by dividing E by the circumference ratio $\pi$ as the gain value.

As shown in Table.1 below, the gain value of the reflection type screen in the comparative example was 0.36, whereas the gain value of the reflection type screen in the example 1 was 0.53. The gain value of the reflection type screen in the example 2, which has the same configuration as the reflection type screen in the example 1 except including no light-absorbing layer, was 0.63, being higher than gain values of the others. Improvement ratios of the gain value of the reflection type screen in the example 1 and the reflection type screen of the example 2 to the gain value of the reflection type screen in the comparative example, are 47% and 75%, respectively.

Also, the contrast values were measured using the reflection type screen in the comparative example, the reflection type screen in the example 1 and the reflection type screen in the example 2, in order to confirm that the contrast gets improved by thickness configuration of each reflecting layer of the reflection type screens of the example 1 and the example 2 and forming the second reflecting layer. A measurement method of the contrast value consists of the procedures [1] to [4] described below.

[1] Setting illumination such that an illuminance at the center of the screen is about 150 [lx].

[2] Projecting a white video image on the screen from the projector. Measuring brightness at the center of the screen by a luminance meter (a measured value to be referred to as W).

[3] Projecting a black video image on the screen from the projector. Measuring brightness at the center of the screen by the luminance meter (a measured value to be referred to as B).

[4] Defining a value obtained by dividing W by B as the contrast value.

As shown in Table. 1 below, the contrast value of the reflection type screen in the comparative example was 12, whereas the contrast value of the reflection type screen in the example 1 was 14. On the other hand, the contrast value of the reflection type screen in the example 2, having no light-absorbing layer therein, was 10. Also, a viewing angle was measured using the reflection type screen in the comparative example, the reflection type screen in the example 1 and the reflection type screen in the example 2. A measurement method of the viewing angle is as follows: in a darkened room, first, projecting the white video image on the screen from the projector, and measuring the brightness at the center of the screen by the luminance meter; then, gradually varying an angle of the luminance meter with respect to the screen; and defining, as the viewing angle, an angle such that the brightness at the center of the screen is equal to a half of that value measured at the opposite position (0°). As shown in Table. 1 below, the viewing angles of the reflection type screen of the comparative example, the reflection type screen of the example 1 and the reflection type screen of the example 2 are confirmed to be 80° or more.

TABLE 1

| | Comparative Example | Example 1 | Example 2 |
|---|---|---|---|
| Gain Value | 0.36 | 0.53 | 0.63 |
| Contrast Value | 12 | 14 | 10 |
| Viewing Angle | 80° or above | 80° or above | 80° or above |

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a detection apparatus a reflection type screen for detecting a phase offset and time difference between transmission signals transmitted on different channels.

What is claimed is:

1. A reflection type screen comprising:
    a base portion which is tabular; and
    a plurality of prism portions which are provided on one surface of the base portion, extending in one direction and lined up in a direction intersecting the one direction, wherein
    the plurality of prism portions each have:
        a pair of surfaces, at least one of the pair of surfaces being inclined with respect to a normal direction of the one surface of the base portion and intersecting the other of the pair of surfaces; and
        a reflecting layer, being formed on the one of the pair of surfaces and reflecting light, and
    the reflecting layer includes, on the one of the pair of surfaces, a first thin portion, a thick portion and a second thin portion in this order from a side of an intersection line of the one of the pair of surfaces and the other of the pair of surfaces, and a front surface of the reflecting layer is a non-flat surface.

2. The reflection type screen according to claim 1, wherein the first thin portion extends up to the other of the pair of surfaces crossing the intersection line.

3. The reflection type screen according to claim 1, wherein the plurality of prism portions each further have a second reflecting layer, being formed on the reflecting layer and reflecting light at a narrower viewing angle than a viewing angle of the reflecting layer.

4. The reflection type screen according to claim 3, wherein the second reflecting layer covers at least the thick portion.

5. The reflection type screen according to claim 4, wherein the plurality of prism portions each further have a light-absorbing layer, being formed on the other of the pair of surfaces to absorb light, and the light-absorbing layer extends up to the one of the pair of surfaces crossing the intersection line and does not cover any of the reflecting layer or the second reflecting layer, or covers only a part of at least one of the reflecting layer and the second reflecting layer.

6. The reflection type screen according to claim 5, wherein the plurality of prism portions each further have a low friction layer, being formed on at least one of the reflecting layer and the second reflecting layer and on the light-absorbing layer, and having lower friction coefficient than friction coefficient of the reflecting layer, the second reflecting layer and the light-absorbing layer.

7. The reflection type screen according to claim 4, wherein the plurality of prism portions each further have
   a light-absorbing layer to absorb light, which is formed on the other of the pair of surfaces side on the one of the pair of surfaces so as not to cover any of the reflecting layer or the second reflecting layer, or is formed so as to cover an end portion of the other of the pair of surfaces side in the direction intersecting the one direction of at least one of the reflecting layer and the second reflecting layer, and
   the light-absorbing layer is shorter than the second reflecting layer in the direction intersecting the one direction.

8. The reflection type screen according to claim 4, wherein the plurality of prism portions each further have a low friction layer, being formed on at least one of the reflecting layer and the second reflecting layer, and having lower friction coefficient than friction coefficient of the reflecting layer and the second reflecting layer.

9. The reflection type screen according to claim 3, wherein the plurality of prism portions each further have a light-absorbing layer, being formed on the other of the pair of surfaces to absorb light, and the light-absorbing layer extends up to the one of the pair of surfaces crossing the intersection line, and does not cover any of the reflecting layer or the second reflecting layer, or covers only a part of at least one of the reflecting layer and the second reflecting layer.

10. The reflection type screen according to claim 9, wherein the plurality of prism portions each further have a low friction layer, being formed on at least one of the reflecting layer and the second reflecting layer and on the light-absorbing layer, and having lower friction coefficient than friction coefficient of the reflecting layer, the second reflecting layer and the light-absorbing layer.

11. The reflection type screen according to claim 3, wherein the plurality of prism portions each further have a light-absorbing layer to absorb light, which is formed on the other of the pair of surfaces side on the one of the pair of surfaces so as not to cover any of the reflecting layer or the second reflecting layer, or is formed so as to cover an end portion of the other of the pair of surfaces side in the direction intersecting the one direction of at least one of the reflecting layer and the second reflecting layer, and the light-absorbing layer is shorter than the second reflecting layer in the direction intersecting the one direction.

12. The reflection type screen according to claim 1, wherein the plurality of prism portions each further have a light-absorbing layer, being formed on the other of the pair of surfaces to absorb light, and the light-absorbing layer extends up to the one of the pair of surfaces crossing the intersection line and does not cover the reflecting layer or covers only a part of the reflecting layer.

13. The reflection type screen according to claim 1, wherein the plurality of prism portions each further have light-absorbing layer to absorb light, which is formed on the other of the pair of surfaces side on the one of the pair of surfaces without covering the reflecting layer or is formed so as to cover an end portion of the other of the pair of surfaces side in the direction intersecting the one direction of the reflecting layer, and the light-absorbing layer is shorter than the reflecting layer in the direction intersecting the one direction.

14. The reflection type screen according to claim 13, wherein the plurality of prism portions each further have a low friction layer, being formed on the reflecting layer and the light-absorbing layer, and having lower friction coefficient than friction coefficient of the reflecting layer and the light-absorbing layer.

15. The reflection type screen according to claim 1, wherein the plurality of prism portions each further have a low friction layer, being formed on the reflecting layer and having lower friction coefficient than friction coefficient of the reflecting layer.

16. A reflection type screen comprising:

a base portion which is tabular; and a plurality of prism portions which are provided on one surface of the base portion, extending in one direction and lined up in a direction intersecting the one direction, wherein the plurality of prism portions each have:
   a pair of surfaces, at least one of the pair of surfaces being inclined with respect to a normal direction of the one surface of the base portion and intersecting the other of the pair of surfaces;

a reflecting layer, being formed on the one of the pair of surfaces and reflecting light; and a second reflecting layer, being formed on the reflecting layer and reflecting light at a narrower viewing angle than a viewing angle of the reflecting layer, and the reflecting layer includes, on the one of the pair of surfaces, a first thin portion, a thick portion and a second thin portion in this order from a side of an intersection line of the one of the pair of surfaces and the other of the pair of surfaces, and the plurality of prism portions each further have a low friction layer, being formed on at least one of the reflecting layer and the second reflecting layer, and having lower friction coefficient than friction coefficient of the reflecting layer and the second reflecting layer.

17. A reflection type screen comprising:

a base portion which is tabular; and a plurality of prism portions which are provided on one surface of the base portion, extending in one direction and lined up in a direction intersecting the one direction, wherein the plurality of prism portions each have:
a pair of surfaces, at least one of the pair of surfaces being inclined with respect to a normal direction of the one surface of the base portion and intersecting the other of the pair of surfaces;

a reflecting layer, being formed on the one of the pair of surfaces and reflecting light; and a light-absorbing layer, being formed on the other of the pair of surfaces to absorb light, and the reflecting layer includes, on the one of the pair of surfaces, a first thin portion, a thick portion and a second thin portion in this order from a side of an intersection line of the one of the pair of surfaces and the other of the pair of surfaces, the light-absorbing layer extends up to the one of the pair of surfaces crossing the intersection line and does not cover the reflecting layer or covers only a part of the reflecting layer, and the plurality of prism portions each further have a low friction layer, being formed on the reflecting layer and the light-absorbing layer, and having lower friction coefficient than friction coefficient of the reflecting layer and the light-absorbing layer.

* * * * *